United States Patent
Mullaney et al.

(10) Patent No.: US 7,356,237 B2
(45) Date of Patent: Apr. 8, 2008

(54) OPTICAL FIBER CABLE TERMINATION APPARATUS

(75) Inventors: Julian S. Mullaney, Raleigh, NC (US); William Alan Carrico, Raleigh, NC (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 11/491,644

(22) Filed: Jul. 24, 2006

(65) Prior Publication Data

US 2007/0189694 A1    Aug. 16, 2007

Related U.S. Application Data

(60) Provisional application No. 60/702,146, filed on Jul. 25, 2005.

(51) Int. Cl.
  *G02B 6/00* (2006.01)
(52) U.S. Cl. ..................................... 385/135
(58) Field of Classification Search ............. None
  See application file for complete search history.

(56) References Cited

U.S. PATENT DOCUMENTS

| | | | | |
|---|---|---|---|---|
| 5,189,724 | A | * | 2/1993 | Hartley ................. 385/135 |
| 5,235,665 | A | * | 8/1993 | Marchesi et al. ........ 385/135 |
| 5,440,665 | A | | 8/1995 | Ray et al. .............. 385/135 |
| 5,449,299 | A | | 9/1995 | Shimirak et al. ........ 439/417 |
| 5,528,718 | A | | 6/1996 | Ray et al. .............. 385/136 |
| 5,657,413 | A | | 8/1997 | Ray et al. .............. 385/139 |
| 6,104,855 | A | * | 8/2000 | Jeon ..................... 385/139 |
| 6,579,014 | B2 | | 6/2003 | Melton et al. ........... 385/78 |
| 6,648,520 | B2 | | 11/2003 | McDonald et al. ....... 385/78 |
| 6,829,424 | B1 | * | 12/2004 | Finzel et al. ............ 385/135 |
| 2001/0036342 | A1 | | 11/2001 | Knecht et al. ........... 385/84 |
| 2002/0057870 | A1 | | 5/2002 | Dean, Jr. et al. ......... 385/28 |
| 2003/0063866 | A1 | | 4/2003 | Melton et al. ........... 385/76 |
| 2003/0081910 | A1 | | 5/2003 | Gimbel et al. .......... 385/80 |
| 2003/0103750 | A1 | | 6/2003 | Laporte et al. .......... 385/134 |
| 2003/0123812 | A1 | | 7/2003 | Beatty et al. ........... 385/72 |

(Continued)

OTHER PUBLICATIONS

Corning Cable Systems LLC, "OptiSheath™ Advantage Sealed Terminal (UCA4-xx & UCA5-xx)", Published Feb. 2006.

*Primary Examiner*—Rodney Bovernick
*Assistant Examiner*—Mike Stahl
(74) *Attorney, Agent, or Firm*—Myers Bigel Sibley & Sajovec, P.A.

(57) ABSTRACT

An optical fiber cable termination apparatus for use with an optical fiber cable including a plurality of optical fibers includes at least one optical fiber enclosure assembly. Each optical fiber enclosure assembly includes a housing member and a cover member. The housing member defines an interior cavity and includes: a fiber entrance port in communication with the interior cavity to receive the optical fibers therethrough; a fiber exit port in communication with the interior cavity to receive the optical fibers therethrough; at least one connector port in communication with the interior cavity to receive an optical fiber connector; an access opening in communication with the interior cavity; and a first set of screw threads. The cover member includes a second set of screw threads and is mounted on the housing member by engaging the second set of screw threads with the first set of screw threads and rotating the cover member relative to the housing member. The cover member covers the access opening and encloses the interior cavity.

18 Claims, 8 Drawing Sheets

U.S. PATENT DOCUMENTS

| | | | |
|---|---|---|---|
| 2003/0210871 A1 | 11/2003 | Rosson et al. | 385/78 |
| 2003/0235374 A1 | 12/2003 | Luther et al. | 385/85 |
| 2004/0047566 A1 | 3/2004 | McDonald et al. | 385/78 |
| 2004/0047567 A1 | 3/2004 | Gimbel et al. | 385/80 |
| 2004/0101255 A1 | 5/2004 | Dean, Jr. et al. | 385/85 |
| 2004/0114874 A1 | 6/2004 | Bono et al. | 385/53 |
| 2004/0120656 A1 | 6/2004 | Banas et al. | 385/86 |
| 2004/0123998 A1 | 7/2004 | Berglund et al. | 174/92 |
| 2004/0126069 A1 | 7/2004 | Jong et al. | 385/189 |
| 2004/0152354 A1 | 8/2004 | Luther et al. | 439/378 |
| 2004/0170369 A1* | 9/2004 | Pons | 385/135 |
| 2004/0252960 A1 | 12/2004 | Battey et al. | 385/135 |
| 2005/0031285 A1 | 2/2005 | Barnes et al. | 385/134 |
| 2005/0036742 A1 | 2/2005 | Dean, Jr. et al. | 385/71 |
| 2005/0041926 A1 | 2/2005 | Elkins et al. | 385/53 |
| 2005/0069264 A1 | 3/2005 | Luther et al. | 385/59 |
| 2005/0105873 A1 | 5/2005 | Reagan et al. | 385/135 |
| 2005/0111799 A1 | 5/2005 | Cooke et al. | 385/100 |
| 2005/0111800 A1 | 5/2005 | Cooke et al. | 385/100 |
| 2005/0129375 A1 | 6/2005 | Elkins II et al. | 385/100 |
| 2005/0129379 A1 | 6/2005 | Reagan et al. | 385/135 |
| 2005/0145522 A1 | 7/2005 | Bloodworth et al. | 206/409 |
| 2005/0163448 A1 | 7/2005 | Blackwell, Jr. | 385/135 |
| 2005/0175307 A1 | 8/2005 | Battey et al. | 385/135 |
| 2005/0175308 A1 | 8/2005 | Elkins II et al. | 385/135 |
| 2005/0180705 A1 | 8/2005 | Elkins II et al. | 385/100 |
| 2005/0185895 A1 | 8/2005 | Keenum et al. | 385/76 |
| 2005/0185910 A1 | 8/2005 | Zimmel | 385/135 |
| 2005/0207711 A1 | 9/2005 | Vo et al. | 385/94 |
| 2005/0220421 A1 | 10/2005 | Keenum et al. | 385/62 |
| 2005/0232567 A1 | 10/2005 | Reagan et al. | 385/135 |
| 2005/0276562 A1* | 12/2005 | Battey et al. | 385/135 |

* cited by examiner

OPTICAL FIBER CABLE TERMINATION APPARATUS

RELATED APPLICATION(S)

The present application claims priority from U.S. Provisional Application No. 60/702,146, filed Jul. 25, 2005, the disclosure of which is hereby incorporated herein in its entirety by reference.

BACKGROUND OF THE INVENTION

The present invention relates to communication cable termination devices and, more particularly, to optical fiber termination apparatus and methods for forming and using the same.

An extensive infrastructure supporting telecommunication has been developed, traditionally based upon copper wire connections between individual subscribers and telecommunications company network distribution points. More recently, much of the telecommunications network infrastructure is being extended or replaced with an optical fiber based communications network infrastructure. The carrying capacity and communication rate capabilities of such equipment may exceed that provided by conventional copper wired systems. However, this cable based infrastructure is generally required to be flexibly field installed to allow for additions and deletions of service at access points as the customer mix for a telecommunications provider changes. Accordingly, subscriber optical fiber drop cable access points are typically required for configuring the network to provide services to different customers.

For the optical fiber infrastructure, it is generally desirable to provide sealed environmental protection and flexible incremental connection of subscriber drop cables to provide for rapid and reduced cost deployment of services to different customers. A variety of different products are available for use at access points in optical fiber-based communications networks. For example, the OptiSheath™ Advantage Terminal, available from Corning Incorporated of Corning, N.Y., is available with customer options to accommodate add-as-you-grow applications. The OptiSheath™ is available in six, eight or twelve port customer options, which may be utilized for aerial or buried terminal use in an optical access architecture allowing for subscriber connection. Cables of varying lengths may be preterminated inside the factory for use in the OptiSheath™ Advantage Terminal and the multiport options may allow for configuration in the field of each terminal location based on customer take length and stub length.

SUMMARY OF THE INVENTION

According to some embodiments of the present invention, an optical fiber cable termination apparatus for use with an optical fiber cable including a plurality of optical fibers includes at least one optical fiber enclosure assembly. Each optical fiber enclosure assembly includes a housing member and a cover member. The housing member defines an interior cavity and includes: a fiber entrance port in communication with the interior cavity to receive the optical fibers therethrough; a fiber exit port in communication with the interior cavity to receive the optical fibers therethrough; at least one connector port in communication with the interior cavity to receive an optical fiber connector; an access opening in communication with the interior cavity; and a first set of screw threads. The cover member includes a second set of screw threads and is mounted on the housing member by engaging the second set of screw threads with the first set of screw threads and rotating the cover member relative to the housing member. The cover member covers the access opening and encloses the interior cavity.

According to further embodiments of the present invention, an optical fiber termination apparatus for use with an optical fiber cable including a plurality of optical fibers includes at least one optical fiber enclosure assembly. Each optical fiber enclosure assembly includes a housing member. The housing member defines an interior cavity and includes: a sidewall; a fiber entrance port in communication with the interior cavity to receive the optical fibers therethrough; a fiber exit port in communication with the interior cavity to receive the optical fibers therethrough; an entrance extension extending outwardly from the sidewall and defining an entrance passage having an entrance axis and in communication with the fiber entrance port; an exit extension extending outwardly from the sidewall and defining an exit passage having an exit axis and in communication with the fiber exit port; and at least one connector port in communication with the interior cavity to receive an optical fiber connector. The interior cavity is oval and the entrance axis and the exit axis each intersect the interior cavity at an oblique angle to facilitate bend radius control of optical fibers routed into the interior cavity through the entrance passage, looped within the interior cavity, and routed out of the interior cavity through the exit passage.

According to some embodiments of the present invention, an optical fiber cable termination apparatus for use with an optical fiber cable including a plurality of optical fibers includes at least one optical fiber enclosure assembly including a housing member. The housing member defines an interior cavity and includes: a fiber port in communication with the interior cavity to receive the optical fibers therethrough; and at least one connector port in communication with the interior cavity to receive an optical fiber connector. Each optical fiber enclosure assembly further includes at least one of a closure system and a cable control system. The closure system includes: an access opening defined in the housing member and in communication with the interior cavity; and a first set of screw threads forming a part of the housing member; and a cover member including a second set of screw threads and mounted on the housing member by engaging the second set of screw threads with the first set of screw threads and rotating the cover member relative to the housing member, wherein the cover member covers the access opening and encloses the interior cavity. The cable control system includes: a sidewall forming a part of the housing member; and an extension forming a part of the housing member and extending outwardly from the sidewall, the extension defining a passage having an axis and in communication with the fiber port; wherein the interior cavity is oval and the entrance axis and the exit axis each intersect the interior cavity at an oblique angle to facilitate bend radius control of optical fibers routed into the interior cavity through the entrance passage, looped within the interior cavity, and routed out of the interior cavity through the exit passage.

Further features, advantages and details of the present invention will be appreciated by those of ordinary skill in the art from a reading of the figures and the detailed description of the exemplary embodiments that follow, such description being merely illustrative of the present invention.

DETAILED DESCRIPTION OF EMBODIMENTS OF THE INVENTION

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present specification and will not be interpreted in an idealized or overly formal sense unless expressly so defined herein.

Figure 1:
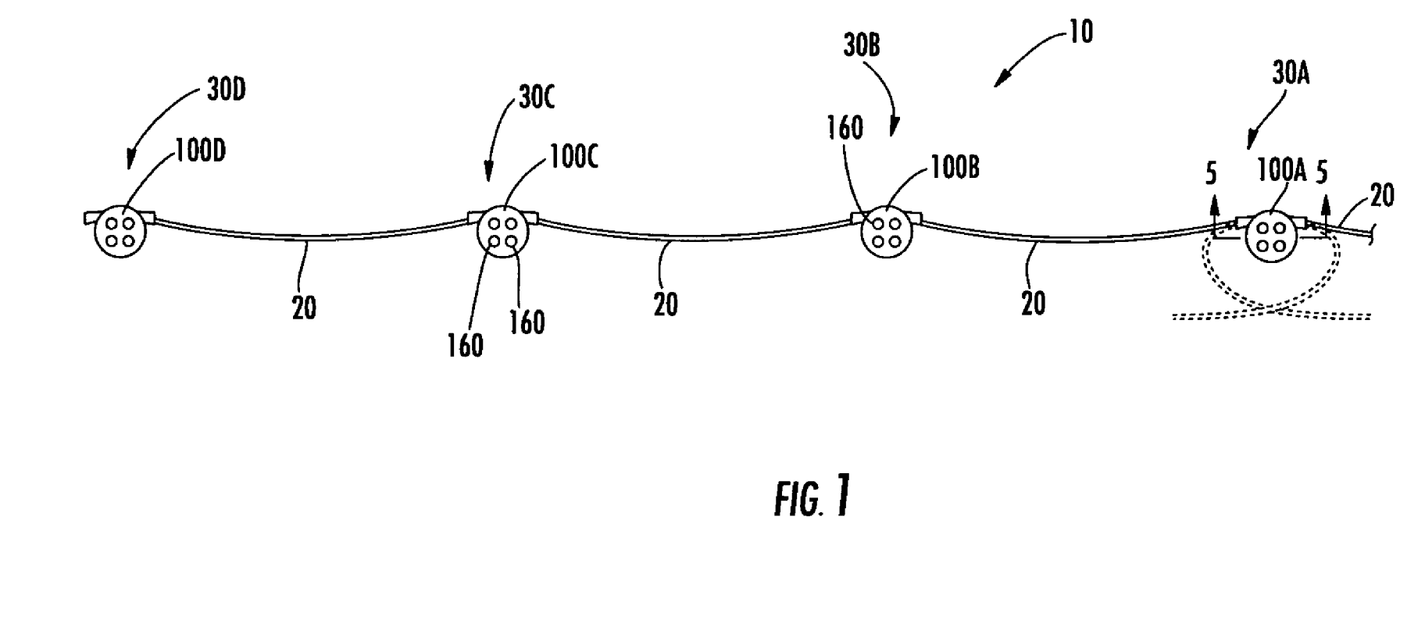
FIG. 1 is a top plan view illustrating a terminated cable system according to some embodiments of the present invention.

Embodiments of the present invention will now be further described with reference to the various embodiments illustrated in FIGS. 1-8. With reference to FIG. 1, a multi-tap terminated optical fiber cable system or cable assembly 10 according to some embodiments of the present invention is shown therein. As shown in FIG. 1, the cable system 10 includes a plurality of optical fiber enclosure assemblies 100A, 100B, 100C, 100D and an optical fiber cable 20 that may be routed through and selectively terminated in the optical fiber enclosure assemblies 100A-D to form a series of cable termination apparatus 30A, 30B, 30C, 30D. Each of the cable termination apparatus 30A-D includes a respective one of the enclosure assemblies 100A-D and a segment of the cable 20 extending therethrough and out of the respective enclosure assembly 100A-D.

As discussed herein, optical fibers of the cable 20 are terminated to connectors 160 of the enclosure assemblies 100A-D so that each of the enclosure assemblies 100A-D may be used as a fiber tap off point. According to some embodiments, each of the enclosure assemblies 100A-D may serve as a multi-tap termination device. For example, the cable 20 may be used to feed a street, small neighborhood or the like. The enclosure assemblies 100A-D may be installed at predetermined intervals along the length of the cable 20 to form the apparatus 10. The apparatus 10 may then be installed, for example, in the ground. Once installed, the tap off points may, for example, align with new or existing handhole access enclosures that are installed in the ground when and or after the new cable 20 is installed. The apparatus 10 may be custom designed or configured such that the tap off points will fall on or along respective property lines or parcels for a specific street in a unique location, for example.

According to some embodiments, the apparatus 10 is a factory installed termination system (FITS) preconfigured cable assembly. In this case, the apparatus 10 may be built in a factory environment and transported and installed in the end user location.

According to some embodiments, the enclosure assemblies 100A-D are configured to incorporate connectors 160 that are industry standard connectors, such as OPTI-TAP™ connectors, which is a kind of fiber tap off point where a fiber drop cable (to an actual residence, for example) can be attached at a later time.

Figure 4:
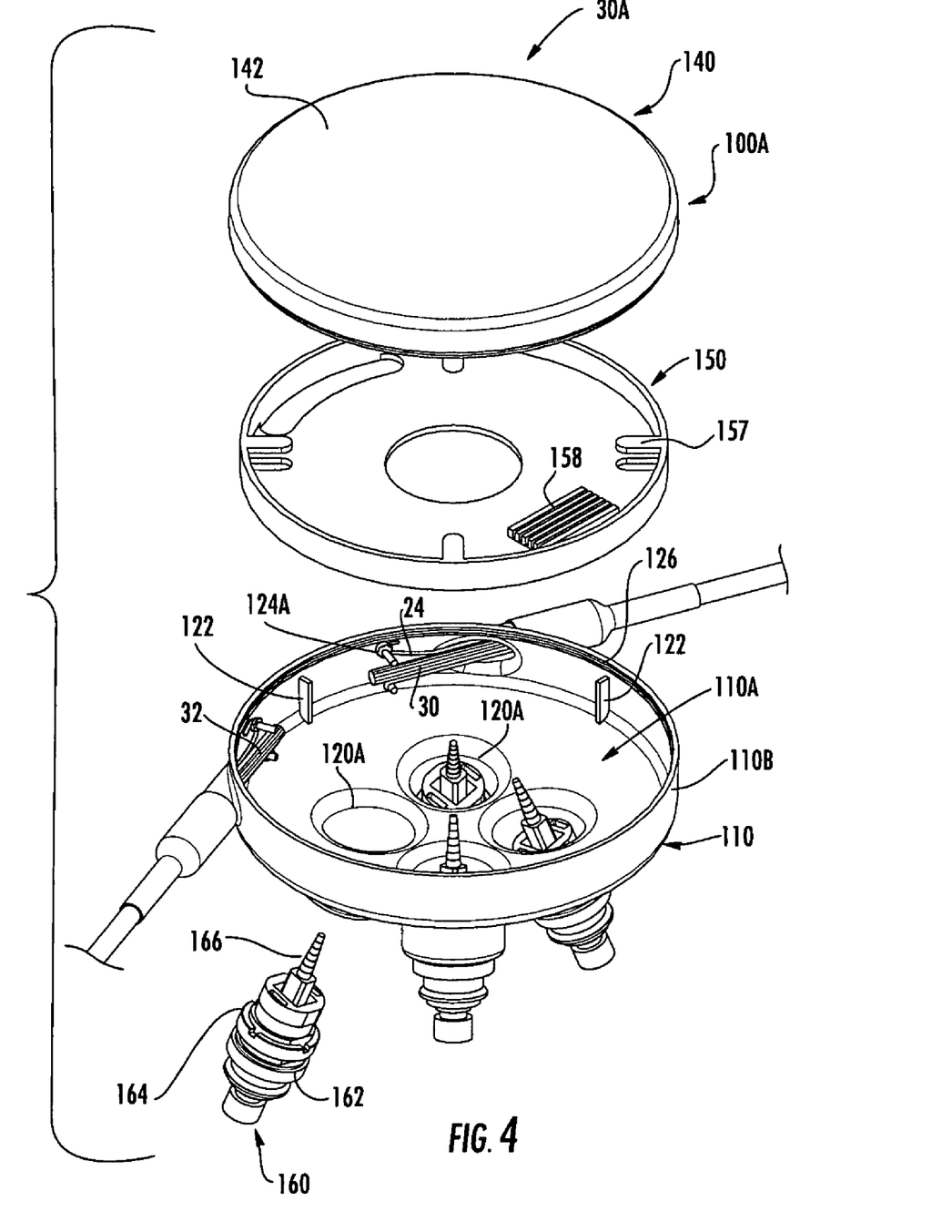
FIG. 4 is a fragmentary, exploded, bottom perspective view of the optical fiber termination apparatus of FIG. 2.
Figure 5:
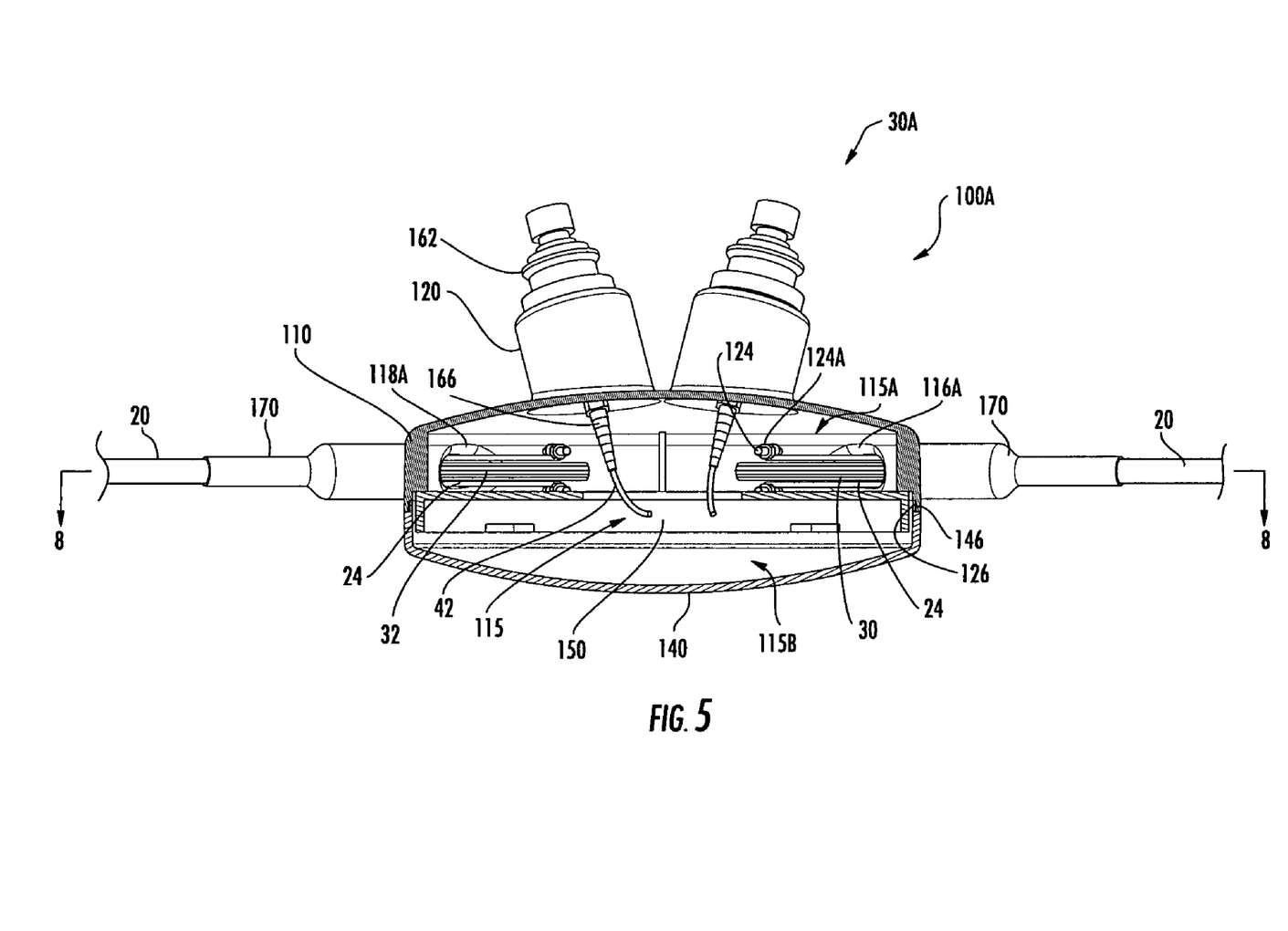
FIG. 5 is a fragmentary, cross-sectional view of the optical fiber termination apparatus of FIG. 2 taken along the line 5-5 in FIG. 1.

The apparatus will now be described in more detail with reference to FIGS. 2-5, wherein the enclosure assembly 100A and adjoining sections or lengths of the cable 20 are shown. The enclosure assemblies 100B-D may be constructed and installed in the same manner as the enclosure assembly 100A, and it will therefore be appreciated that the description of the enclosure assembly 100A hereinbelow likewise applies to the enclosure assemblies 100B-D except as noted. In FIGS. 2-5, portions of the cable 20 are omitted or truncated for the purposes of explanation and clarity. In FIGS. 4 and 5, portions of the cable 20 within the enclosure assembly 100A are omitted or truncated for these purposes.

Figure 3:
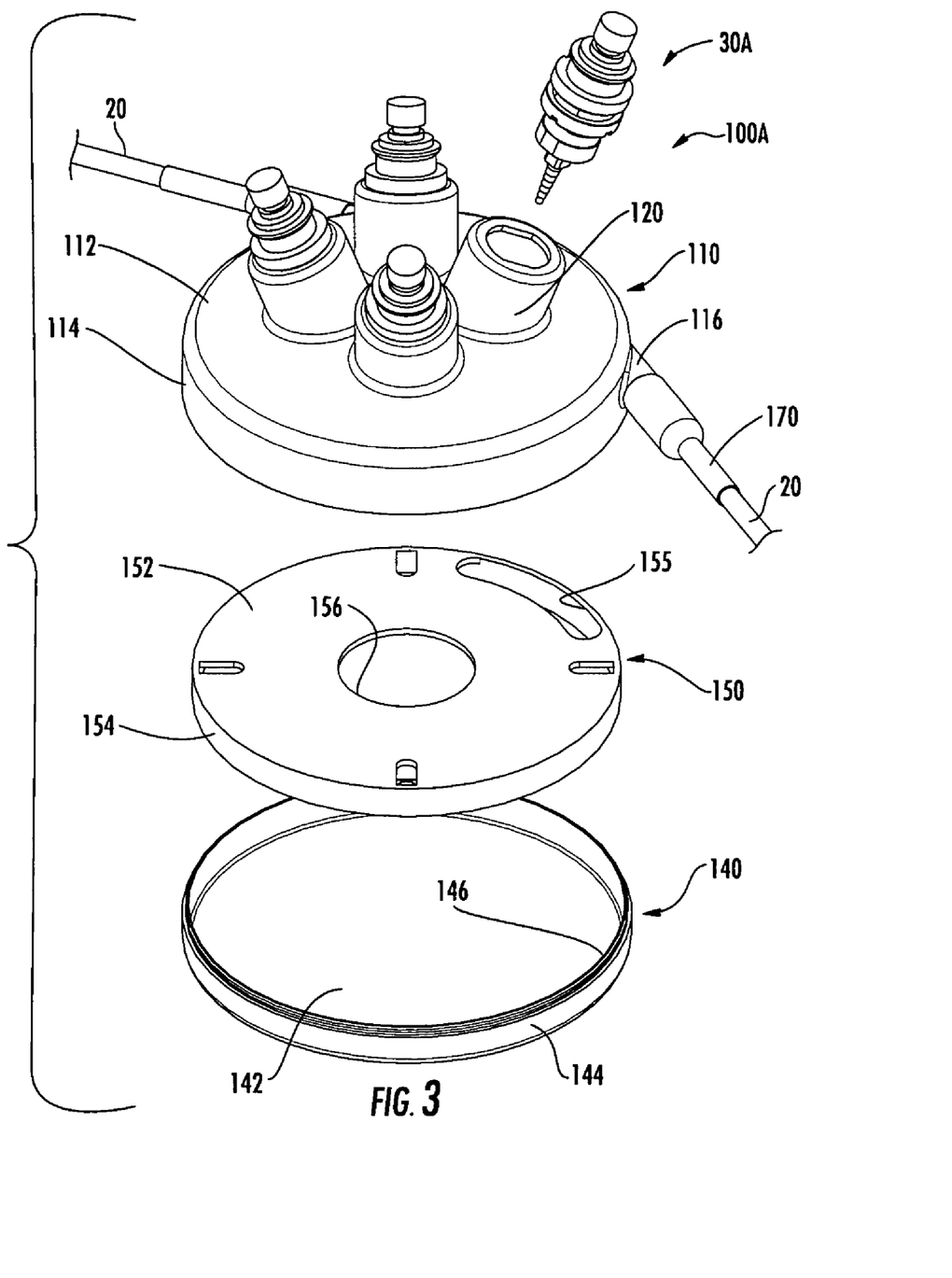
FIG. 3 is a fragmentary, exploded, top perspective view of the optical fiber termination apparatus of FIG. 2.

As best seen in FIGS. 3 and 5, the illustrated enclosure assembly 100A includes a main housing member 110, a cover member 140 and a partition member 150 collectively forming a housing 101. The housing 101 defines an interior cavity 115 that is divided into an upper compartment or chamber 115A and a lower compartment or chamber 115B by the partition member 150.

The housing member 110 includes a top or end wall 112, a side wall 114, a tubular fiber entrance extension 116, a tubular fiber exit extension 118, and tubular connector mount extensions 120. The housing member 110 defines an interior cavity 110A and an access opening 110B communicating with the interior cavity 110A. According to some embodiments, the interior cavity 110A is generally oval and, according to some embodiments and as shown, substantially circular. An entrance port 116A (FIG. 8) and an entrance passage 116B (FIG. 8) communicate with the interior cavity 110A through the side wall 114. An exit port 118A (FIG. 8) and an exit passage 118B (FIG. 8) also communicate with the interior cavity 110A through the side wall 114.

Respective connector ports 120A and the connector mount extensions 120 communicate with the interior cavity 110A through the top wall 112. Integral stand offs 122 and threaded anchor posts 124 project radially inwardly from the side wall 114. Nuts 124A are threadedly mounted on the anchor posts 124. Internal threads 126 are provided on the side wall 114 adjacent the opening 110B. According to some embodiments, the outer profile of the side wall 114 is generally oval and, according to some embodiments, substantially circular.

The cover member 140 includes a bottom or end wall 142 and a side wall 144. External threads 146 are provided on the side wall 144. According to some embodiments, the cover member 140 is generally oval and, according to some embodiments and as shown, substantially circular.

The partition member 150 includes a top or main wall 152 and a side wall 154. An offset slot 155 and a central opening 156 are formed in the top wall 152. Retention tabs 157 extend radially inwardly from the side wall 154. A splice tray 158, including a plurality of splice holding grooves, is shown formed or mounted on the top wall 152.

The housing member 110, the cover member 140 and the partition member 150 may be formed of any suitable material. According to some embodiments, the components 110, 140, 150 are formed of a polymeric material. According to some embodiments, the components 110, 140, 150 are molded. According to some embodiments, each of the housing member 110, the cover member 140 and/or the partition member 150 is integrally molded.

As seen in FIG. 4, according to some embodiments, each of the connectors 160 includes a main connector 162, such as an OPTI-TAP™ connector, a nut 164, and a backside connector 166. The backside connectors 166 may each include a pre-installed optical fiber segment 42.

Heat shrink tubes 170 are mounted over the extensions 116, 118 and the cable 20 to environmentally seal the cable entrance and exit points. The heat shrink tubes 170 may be formed of any suitable heat shrink material. According to some embodiments, other types of sealing devices or materials may be used, such as rubber sealing washers.

Figure 2:
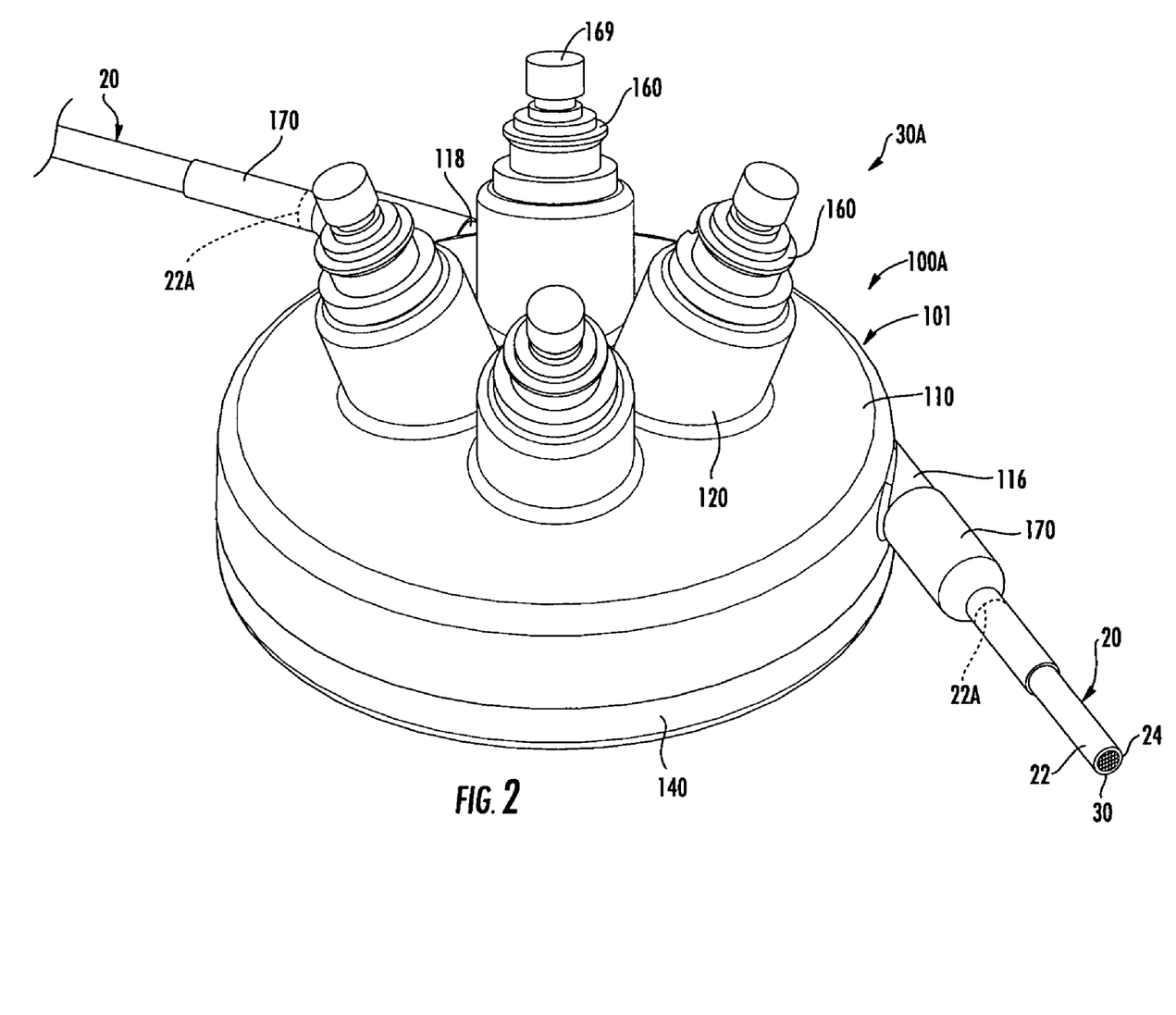
FIG. 2 is a fragmentary, top perspective view of a optical fiber termination apparatus of the terminated cable system of FIG. 1.

The cable 20 as illustrated in FIG. 2 is merely exemplary and includes a jacket 22, which surrounds a pair of strength yarns 24 and a bundle 30 of optical fibers. According to some embodiments, the cable 20 is a small fiber count cable having from about 10 to about 50 fibers. The construction of the enclosure assembly 100A and the apparatus 10 may be further appreciated from the description of methods of assembly according to embodiments of the present invention as follows.

As seen in FIG. 5, the main connectors 162 are mounted in respective ones of the connector mount extensions 120 and secured in place using the nuts 164. A section of the jacket 22 is removed from the cable 20 so that the underlying sections of the strength members 24 and the fiber bundle 30 are exposed. The cable 20 is routed into the housing member 110 through the fiber entrance port 116A and out of the housing member 110 through the fiber exit port 118A, such that the exposed sections of the strength members 24 and the fiber bundle 30 are disposed between the ports 116A, 118A. Alternatively, the cable 20 may be routed through the ports 116A, 118A and the section of jacket 22 then removed. The sections of the strength members 24 and the fiber bundle 30 may be longer than necessary to span the distance between the ports 116A, 118A. The excess length of the fiber bundle 30 may be used during termination of fibers thereof in the enclosure assembly 100A, as described below.

According to some embodiments, the opposing edges 22A (FIG. 2) of the cut jacket 22 are positioned adjacent the outer ends of the extensions 116, 118 and the heat shrink tubing 170 is heat shrunk in place over the extensions 116, 118 and the adjacent portions of the jacket 22 as shown in FIG. 2 to secure the cable 20 relative to the housing member 110 and to environmentally seal the junctures between the cable 20 and the housing member 110.

The strength members 24 and selected optical fibers 34 (referred to herein as "cut fibers" or "terminated fibers") of the fiber bundle 30 are cut while other optical fibers 32 (referred to herein as "expressed fibers") of the fiber bundle 30 are left uncut. According to some embodiments, only the fibers that are intended to the terminated in the enclosure assembly 100A are cut. Sections of the strength members 24 may be removed. The strength members 24 from either side of the cable 20 may be routed to respective anchor posts 124 and secured in place by the nuts 124A to provide cable strain relief on either side of the housing member 110. The excess length of the expressed fibers 32 may be coiled or routed about the interior cavity 110A so as to form a fiber loop 32A as shown in FIG. 6, which is a top plan view of the housing member 110 with the cable 20 installed.

Figure 7:
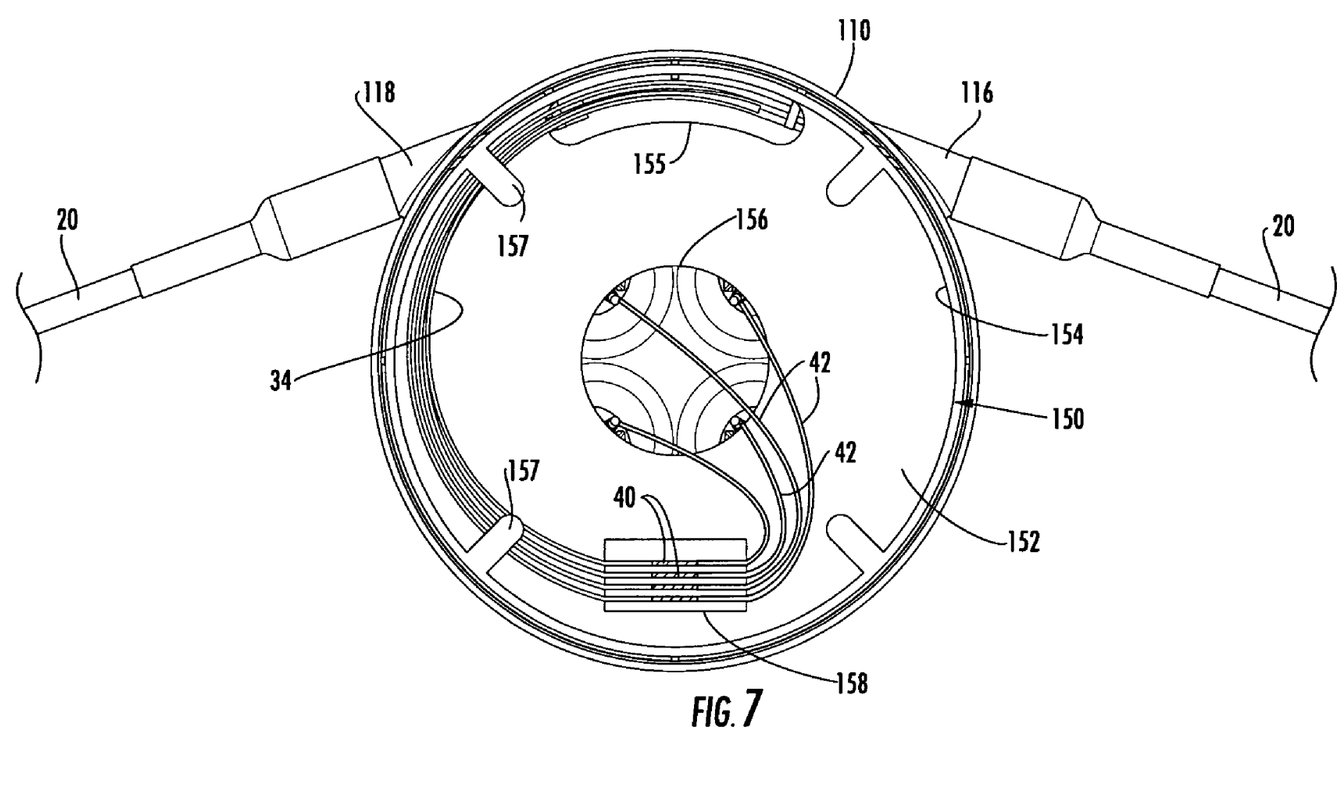

The cut fibers 34 may have an excess length equal to the excess length of the expressed fibers 32 which form the loop 32A. The cut fibers 34 may be inserted through the slot 155 of the partition member 150, which is mounted in the housing member 110 as shown in FIG. 7. The free ends of the cut fibers 34 may be optically coupled or attached to the fiber segments 42 preterminated to the backside connectors 166. Each of the cut fibers 34 may be coupled to the respective fiber segments 42 by a fusion splice, a mechanical splice, and/or a connector, such as an SC connector and/or an FC connector. The connections or splices 40 shown in FIG. 7 may be secured in the splice tray 158 and the fibers 34 can be routed about the inner perimeter of the partition member 150. The backside connectors 166 may be engaged with the main connectors 162 to complete the optical connection between the cut fibers 34 and the main connectors 162, thereby terminating the cut fibers 34.

The cover member 140 may be placed over the opening 110B, the threads 146 are engaged with threads 126, and the cover member 140 may be rotated relative to the housing member 110 to secure the cover member 140 down onto the housing member 110. The cover member 140 may thereby environmentally seal (and, according to some embodiments, hermetically seal) the housing member 110. According to some embodiments, an O-ring or other sealing device may be provided to supplement the seal between the housing member 110 and the cover member 140.

Figure 6:
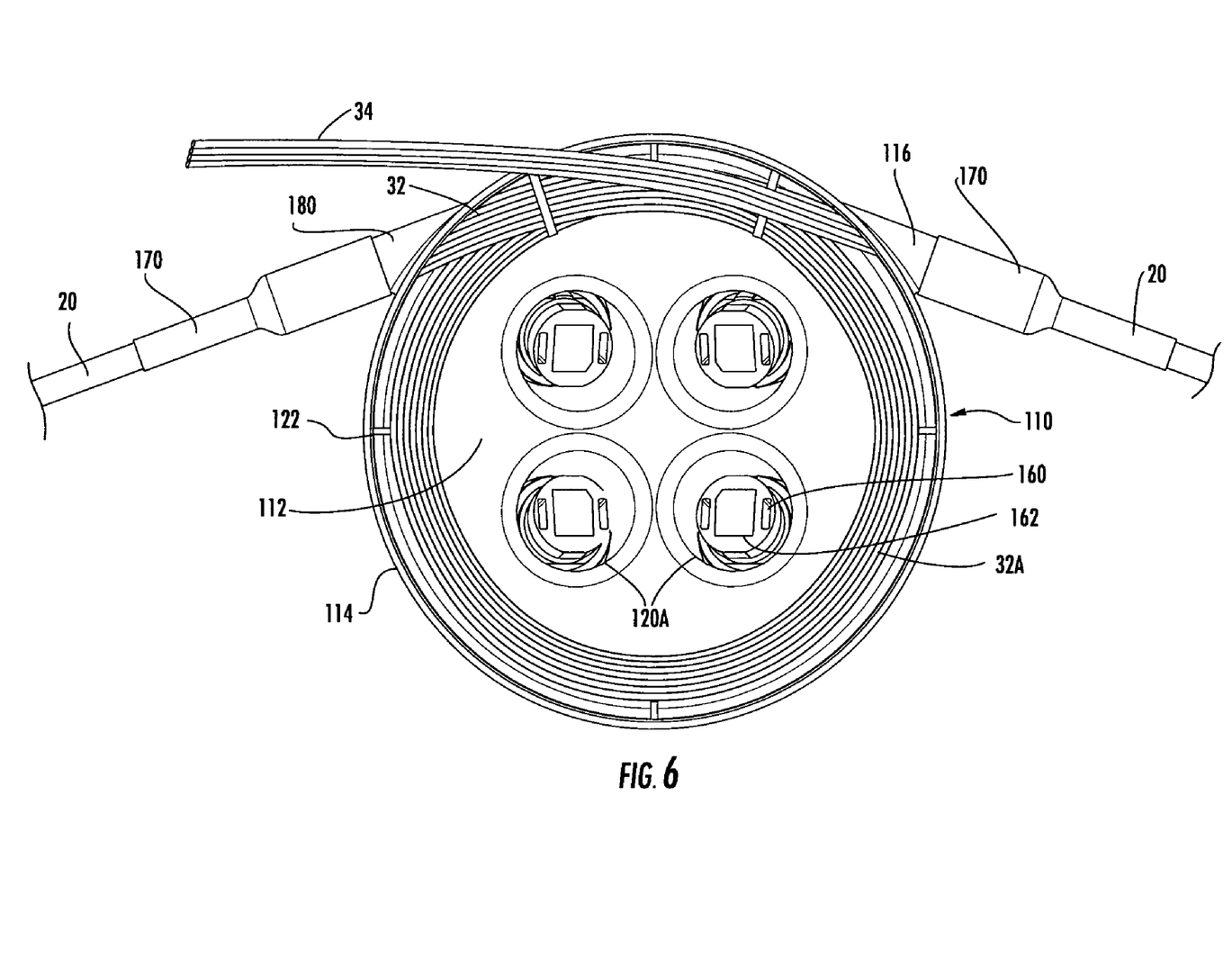
FIGS. 6 and 7 are fragmentary, bottom plan views of the optical fiber termination apparatus of FIG. 2 illustrating steps for assembling the optical fiber termination apparatus.
Figure 8:
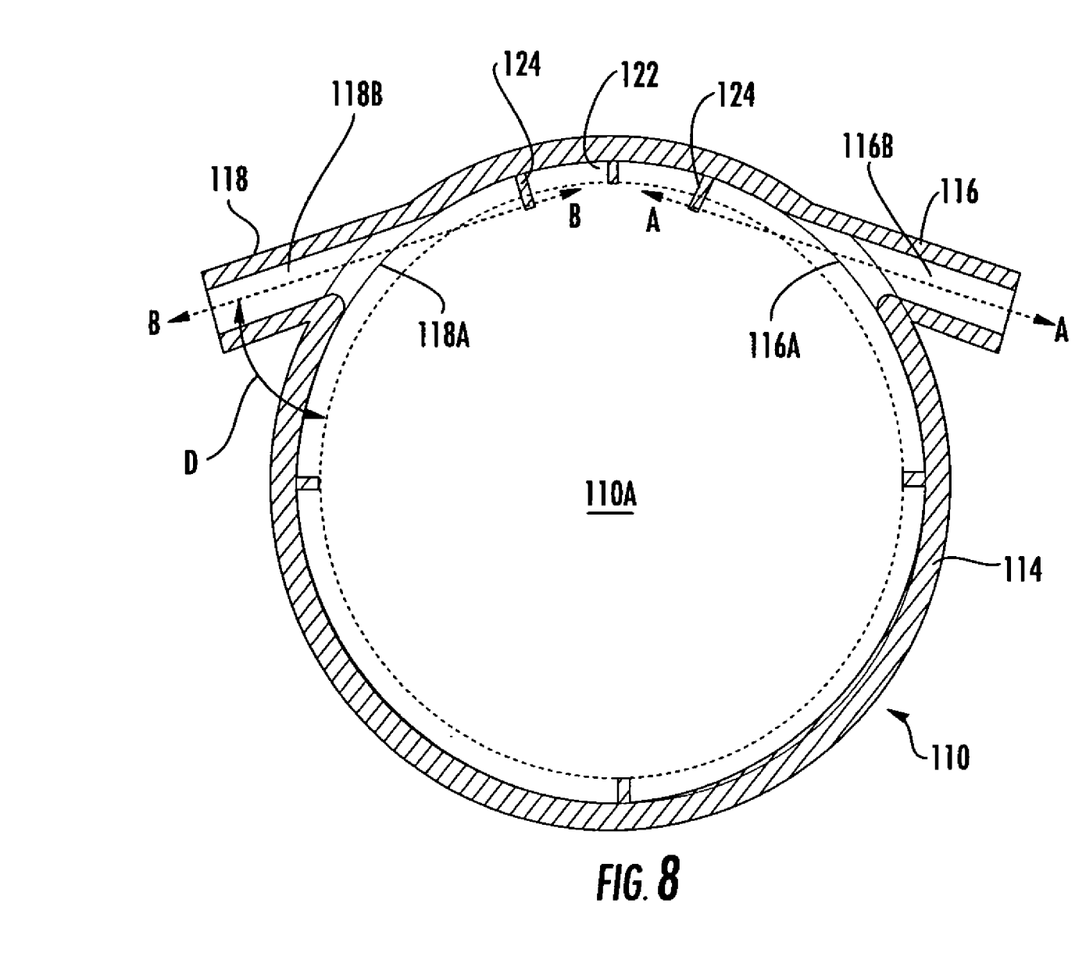
FIG. 8 is a cross-sectional view of a housing member forming a part of the optical fiber termination apparatus of FIG. 2 taken along the line 8-8 of FIG. 5.

With reference to the embodiments of FIGS. 6 and 8, the entrance and exit extensions 116, 118 are each angled with respect to the interior cavity 110A. More particularly, the axis A-A (FIG. 8) of the passage 116B defined by the extension 116 and the axis B-B of the passage 118B defined by the extension 118 each form oblique angles with the circle (represented in dashed lines in FIG. 8) of the interior cavity 110A. This arrangement may serve to advantageously provide a minimum bend radius for the fibers upon entering and prior to exiting the interior cavity 110A. According to some embodiments, the angle D between each axis A-A, B-B and the interior cavity 110A is no less than about 140 degrees.

Additionally, according to some embodiments and as illustrated, the entrance extension 116 and extension 118 are oppositely angled so that together they generally form part or section of a round or circular shape. This configuration may assist in more readily or tightly coiling the cable 20 about the enclosure assembly 100A, for example as illustrated in dashed lines in FIG. 1. Such coiling may be desirable if the enclosure assembly is placed in a round handhole, for example.

The installation of the other enclosure assemblies 110B-D may be accomplished in the same manner as described above for the enclosure assembly 100A. For example, the optical fibers expressed through the enclosure assembly 100A may be routed through the enclosure assembly 100B, where some of the optical fibers are terminated and others are expressed through to the enclosure assembly 100C, where some of these optical fibers are terminated and others are expressed through to the enclosure assembly 100D for termination.

According to some embodiments, the chambers 115A, 115B may be environmentally isolated or sealed with respect to one another. For example, sealing members may be installed about the cut fibers 34 in the slot 155 and the opening 156. Further compartments may be provided as well and suitably environmentally isolated from the others. In such embodiments, in the event that one of the compartments is flooded or otherwise subjected to environmental contamination, the others may not be affected. In addition, covers 169 may be provided on the connectors 160 to provide for sealing of the respective compartment associated with a given connector 160 when the connector 160 is not in use.

The apparatus 10 may provide various advantages in use and assembly. The cover member 140 can be simply and conveniently installed to provide a reliable seal by rotating the cover member 140 relative to the housing member 110. Thus, it may not be necessary to rotate the housing member 110 or employ complex or cumbersome bolts, gaskets and the like that may form less reliable seals. Notably, the cable 20 running through the housing member 110 may make rotation of the housing member 110 difficult or impossible.

The apparatus 10 may provide a non-taut sheath splice configuration while accommodating excess lengths of uncut fibers (e.g., the expressed fibers 32) with bend radius control. More particularly, the diameter of the interior cavity 110A of the housing member 110 may be chosen to provide a minimum bend radius for the fibers wound therein that is not less than a prescribed or specified minimum bend radius for the fibers and/or that will not be expected to damage the uncut fibers 32.

The entrance and exit ports 116A, 118A and the extensions 116B, 118B may have relatively simple geometries. Thus, relatively simple and reliable means may be employed to seal the assembly 110A with the cable 20 as the cable 20 enters and exits the enclosure assembly 100A through the ports 116A, 118A and/or the extensions 116B, 118B. For example, heat shrink tubing and/or rubber sealing washers may be well suited to sealing such simple geometries.

As discussed, the enclosure assembly 100A in accordance with embodiments of the present invention may permit a user to express selected uncut fibers through the enclosure assembly 100A without the expense of totaling severing the fiber bundle 30 and resplicing the same. The enclosure assembly 100A may provide this functionality while also being less expensive and/or providing a more reliable environmental seal as compared to split tube or wrap-around design taut sheath splice devices and methods.

According to some embodiments and as shown, the top wall 112 may be generally dome-shaped and the connector port extensions 120 extend at an angle outwardly from the top wall 112 and away from each other. This configuration may facilitate access and connections to the connectors 160 by an end user.

While four enclosure assemblies 100A-D are shown for the purposes of explanation, more or fewer enclosure assemblies may be provided. For example, an apparatus according to some embodiments of the present invention may include only a single such enclosure assembly, which may be on an end thereof with or without uncut fibers 34 extending therethrough.

The enclosure assembly 100A may be modified such that the threads 146 are provided on the interior of the cover member 140 and the threads 126 are provided on the exterior of the housing member 110. According to further embodiments, the cover member 140 may be secured to the housing member 110 using other techniques in addition to or in place of the threads 126, 146. For example, screws or other fasteners may be employed.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. An optical fiber cable termination apparatus for use with an optical fiber cable including a plurality of optical fibers, the optical fiber termination apparatus comprising at least one optical fiber enclosure assembly including:
   a housing member defining an interior cavity and including:
      a fiber entrance port in communication with the interior cavity to receive the optical fibers therethrough;
      a fiber exit port in communication with the interior cavity to receive the optical fibers therethrough;
      at least one connector port in communication with the interior cavity to receive an optical fiber connector;
      an access opening in communication with the interior cavity; and
      a first set of screw threads; and
   a cover member including a second set of screw threads and mounted on the housing member by engaging the second set of screw threads with the first set of screw threads and rotating the cover member relative to the housing member, wherein the cover member covers the access opening and encloses the interior cavity.

2. The optical fiber cable termination apparatus of claim 1 wherein the housing member has first and second opposed sides, the at least one connector port is located on the first side, the access opening is located on the second side, and the cover member is mounted on the second side.

3. The optical fiber cable termination apparatus of claim 2 wherein the optical fiber enclosure assembly includes a partition member disposed in the interior cavity between the at least one connector port and the cover member to divide the interior cavity into a first chamber adjacent the at least one connector port and a second chamber adjacent the cover member.

4. The optical fiber cable termination apparatus of claim 1 wherein the housing member and the cover member are each substantially circular.

5. The optical fiber cable termination apparatus of claim 1 including a fiber optic connector mounted in each of the connector ports.

6. The optical fiber cable termination apparatus of claim 1 wherein the housing member includes an end wall, the at least one connector port includes a plurality of connector ports in the end wall, a fiber optic connector is mounted in each of the connector ports, and the end wall is dome-shaped such that the fiber optic connectors extend at an angle outwardly from the end wall and away from one another.

7. The optical fiber cable termination apparatus of claim 1 further including:
   a connector mounted in the at least one connector port; and
   an optical fiber cable including a plurality of optical fibers; wherein:
      a first one of the optical fibers extends through the entrance port into the interior cavity and is optically connected to the connector; and
      a second one of the optical fibers extends through the entrance port into the interior cavity, forms a loop in the interior cavity, and extends uncut out of the interior cavity through the exit port.

8. The optical fiber cable termination apparatus of claim 7 wherein the optical fiber cable further includes a strength member and the strength member is secured to the optical fiber enclosure assembly to provide strain relief.

9. The optical fiber cable termination apparatus of claim 7 wherein:
   the at least one optical fiber enclosure assembly includes first and second optical fiber enclosure assemblies;
   the optical fiber termination apparatus further includes:
      a connector mounted in the at least one connector port of each of the first and second optical fiber enclosure assemblies; and
      an optical fiber cable including a plurality of optical fibers;
   a first one of the optical fibers extends through the entrance port of the first optical fiber enclosure assembly into the interior cavity of the first optical fiber enclosure assembly and is optically connected to the connector of the first optical fiber enclosure assembly;
   a second one of the optical fibers extends through the entrance port of the first optical fiber enclosure assembly into the interior cavity of the first optical fiber enclosure assembly, forms a loop in the interior cavity of the first optical fiber enclosure assembly, extends uncut out of the interior cavity of the first optical fiber enclosure assembly through the exit port of the first optical fiber enclosure assembly, extends through the entrance port of the second optical fiber enclosure assembly into the interior cavity of the second optical fiber enclosure assembly, and is optically connected to the connector of the second optical fiber enclosure assembly; and
   a third one of the optical fibers extends through the entrance port of the first optical fiber enclosure assembly into the interior cavity of the first optical fiber enclosure assembly, forms a loop in the interior cavity of the first optical fiber enclosure assembly, extends uncut out of the interior cavity of the first optical fiber enclosure assembly through the exit port of the first optical fiber enclosure assembly, extends through the entrance port of the second optical fiber enclosure assembly into the interior cavity of the second optical fiber enclosure assembly, and extends uncut out of the interior cavity of the second optical fiber enclosure assembly through the exit port of the second optical fiber enclosure assembly.

10. The optical fiber cable termination apparatus of claim 1 wherein
   the housing member includes:
      a sidewall;
      an entrance extension extending outwardly from the sidewall and defining an entrance passage having an entrance axis and in communication with the fiber entrance port; and
      an exit extension extending outwardly from the sidewall and defining an exit passage having an exit axis and in communication with the fiber exit port; and
      the interior cavity is oval and the entrance axis and the exit axis each intersect the interior cavity at an oblique angle to facilitate bend radius control of optical fibers routed into the interior cavity through the entrance passage, looped within the interior cavity, and routed out of the interior cavity through the exit passage.

11. A preterminated cable system including:
   an optical fiber cable including a plurality of optical fibers; and
   a plurality of the optical fiber cable termination apparatus of claim 1 mounted at predetermined locations on the cable such that at least some of the optical fibers are preterminated in the plurality of the optical fiber cable termination apparatus.

12. An optical fiber cable termination apparatus for use with an optical fiber cable including a plurality of optical fibers, the optical fiber cable termination apparatus comprising at least one optical fiber enclosure assembly including:
- a housing member defining an interior cavity and including:
  - a sidewall;
  - a fiber entrance port in communication with the interior cavity to receive the optical fibers therethrough;
  - a fiber exit port in communication with the interior cavity to receive the optical fibers therethrough;
  - an entrance extension extending outwardly from the sidewall and defining an entrance passage having an entrance axis and in communication with the fiber entrance port;
  - an exit extension extending outwardly from the sidewall and defining an exit passage having an exit axis and in communication with the fiber exit port; and
  - at least one connector port in communication with the interior cavity to receive an optical fiber connector;
  - wherein the interior cavity is oval and the entrance axis and the exit axis each intersect the interior cavity at an oblique angle to facilitate bend radius control of optical fibers routed into the interior cavity through the entrance passage, looped within the interior cavity, and routed out of the interior cavity through the exit passage.

13. The optical fiber cable termination apparatus of claim 12 wherein the entrance and exit passages are oppositely angled relative to the interior cavity.

14. The optical fiber cable termination apparatus of claim 12 wherein the entrance and exit passages each intersect the interior cavity at an oblique angle of no less than about 140 degrees.

15. The optical fiber cable termination apparatus of claim 12 further including:
- a connector mounted in the at least one connector port; and
- an optical fiber cable including a plurality of optical fibers;
- wherein:
  - a first one of the optical fibers extends through the entrance passage into the interior cavity, and is optically connected to the connector; and
  - a second one of the optical fibers extends through the entrance passage into the interior cavity, forms a loop in the interior cavity, and extends uncut out of the interior cavity through the exit passage.

16. The optical fiber cable termination apparatus of claim 15 wherein the optical fiber cable further includes a strength member and the strength member is secured to the optical fiber enclosure assembly to provide strain relief.

17. The optical fiber cable termination apparatus of claim 15 wherein:
- the at least one optical fiber enclosure assembly includes first and second optical fiber enclosure assemblies;
- the optical fiber termination apparatus further includes:
  - a connector mounted in the at least one connector port of each of the first and second optical fiber enclosure assemblies; and
  - an optical fiber cable including a plurality of optical fibers;
- a first one of the optical fibers extends through the entrance passage of the first optical fiber enclosure assembly into the interior cavity of the first optical fiber enclosure assembly and is optically connected to the connector of the first optical fiber enclosure assembly;
- a second one of the optical fibers extends through the entrance passage of the first optical fiber enclosure assembly into the interior cavity of the first optical fiber enclosure assembly, forms a loop in the interior cavity of the first optical fiber enclosure assembly, extends uncut out of the interior cavity of the first optical fiber enclosure assembly through the exit passage of the first optical fiber enclosure assembly, extends through the entrance passage of the second optical fiber enclosure assembly into the interior cavity of the second optical fiber enclosure assembly, and is optically connected to the connector of the second optical fiber enclosure assembly; and
- a third one of the optical fibers extends through the entrance passage of the first optical fiber enclosure assembly into the interior cavity of the first optical fiber enclosure assembly, forms a loop in the interior cavity of the first optical fiber enclosure assembly, extends uncut out of the interior cavity of the first optical fiber enclosure assembly through the exit passage of the first optical fiber enclosure assembly, extends through the entrance passage of the second optical fiber enclosure assembly into the interior cavity of the second optical fiber enclosure assembly, and extends uncut out of the interior cavity of the second optical fiber enclosure assembly through the exit passage of the second optical fiber enclosure assembly.

18. A preterminated cable system including:
- an optical fiber cable including a plurality of optical fibers; and
- a plurality of the optical fiber cable termination apparatus of claim 12 mounted at predetermined locations on the cable such that at least some of the optical fibers are preterminated in the plurality of the optical fiber cable termination apparatus.

* * * * *